(12) United States Patent
Atallah

(10) Patent No.: US 7,679,895 B2
(45) Date of Patent: Mar. 16, 2010

(54) LUBRICATED DATA CONNECTOR

(75) Inventor: Jean G. Atallah, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 119 days.

(21) Appl. No.: 11/830,771

(22) Filed: Jul. 30, 2007

(65) Prior Publication Data

US 2009/0034184 A1    Feb. 5, 2009

(51) Int. Cl.
*G06F 1/16*    (2006.01)
(52) U.S. Cl. .................. 361/679.32; 710/10; 389/139; 324/693; 428/834
(58) Field of Classification Search .............. 710/10, 710/72; 324/693; 428/834; 340/612; 389/9, 389/139; 361/679–687, 724–727
See application file for complete search history.

(56) References Cited

U.S. PATENT DOCUMENTS

| | | | |
|---|---|---|---|
| 6,552,909 B1 | | 4/2003 | Liebenow |
| 6,729,040 B2 * | | 5/2004 | Mehmandoust ............. 34/443 |
| 2002/0181198 A1 * | | 12/2002 | White et al. ................ 361/685 |
| 2005/0143508 A1 * | | 6/2005 | Tyagi et al. ................. 524/423 |
| 2006/0101459 A1 * | | 5/2006 | Crosier et al. ............... 717/174 |
| 2007/0013535 A1 * | | 1/2007 | Chiu et al. .................. 340/612 |
| 2007/0097601 A1 * | | 5/2007 | Hughes ...................... 361/600 |
| 2007/0152683 A1 * | | 7/2007 | Werner et al. ............... 324/693 |
| 2007/0196698 A1 * | | 8/2007 | Ishiyama .................... 428/834 |
| 2008/0031620 A1 * | | 2/2008 | Hudgins et al. ................ 398/9 |
| 2008/0222313 A1 * | | 9/2008 | Andrus et al. ................ 710/10 |

OTHER PUBLICATIONS

HP 160GB Personal Media Drive; HP Home & Home Office Store online catalog; Copyright 2007; 2 pp.; HewlettPackard Development Company, L. P.; http://www.shopping.hp.com/product/desktop/desktop_hp/storage/1/accessories/EY904AA%2523ABA.

The Gateway DX430 Desktop; Gateway Computers online catalog; Copyright 2007 Gateway, Inc.; 3 pp.; http://www.gateway.com/programs/dx430/index.php.

The Gateway DX430 Desktop; Gateway Computers online catalog; Copyright 2007 Gateway, Inc.; http://www.gateway.com/dw/features_benefits/DX430_PortableMediaDrive.php.

Gateway 120GB Portable Media Drive; Circuit City online catalog; Copyright 1996-2007 Circuity City Stores, Inc.; 2 pp.; http://www.circuitcity.com/ssm/Gateway-120GB-Portable-Media-Drive-PMD01120H/sem/rpsm/oid/179406/catOid/-12976/rpem/ccd/productDetail.do.

* cited by examiner

*Primary Examiner*—Hung V Duong

(57) ABSTRACT

A device comprising a cavity adapted to house a removable, electronic storage device. The device also comprises a data connector adapted to blind-mate with the storage device. The data connector is lubricated.

20 Claims, 4 Drawing Sheets

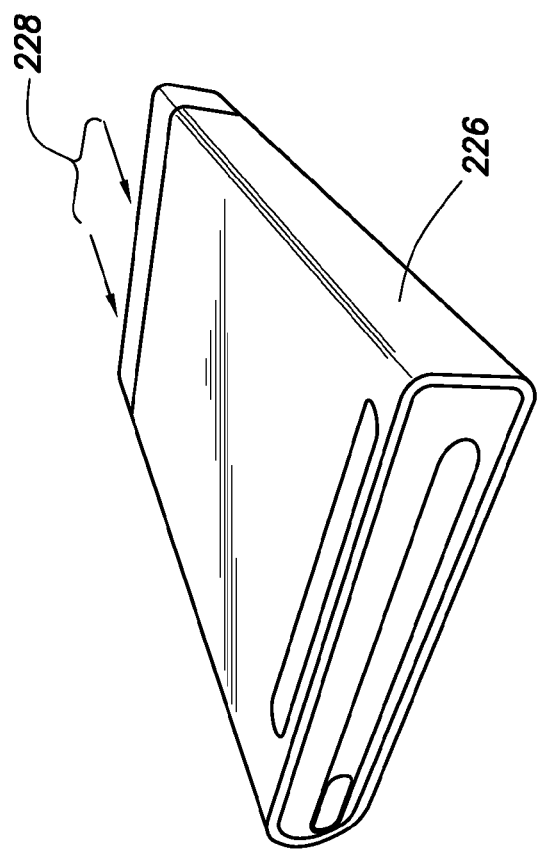
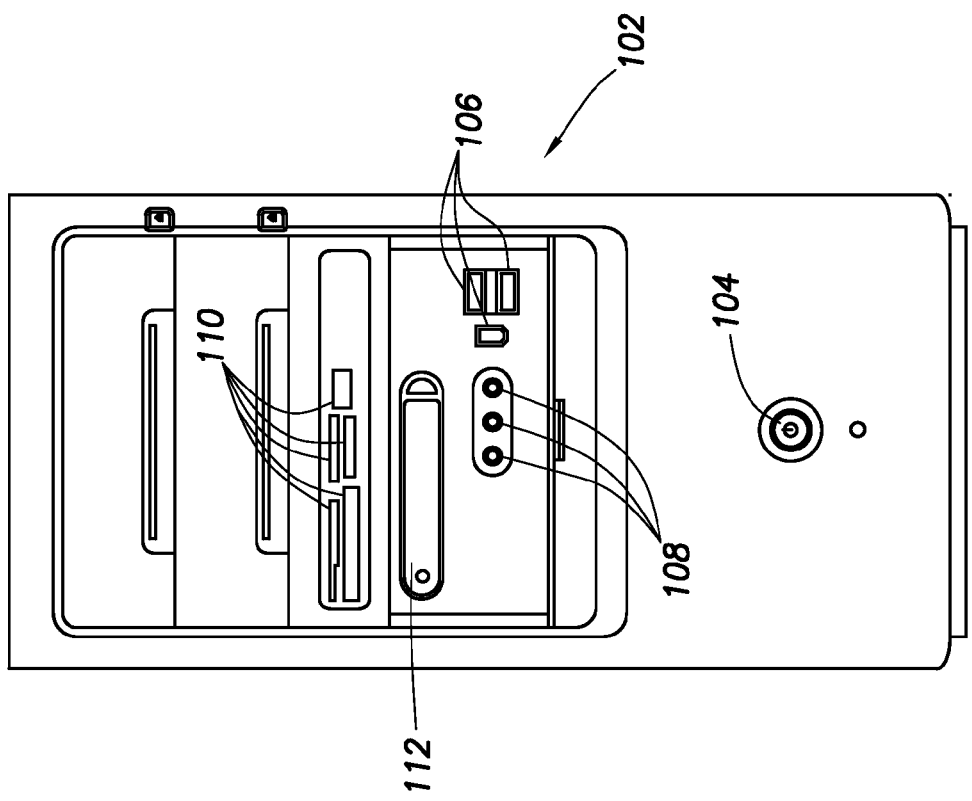
FIG. 7A
FIG. 1

LUBRICATED DATA CONNECTOR

BACKGROUND

Many storage devices can be removably coupled to computers. Known as removable storage devices, the devices include hard drives, flash drives, etc. Such removable storage devices may be coupled and de-coupled from computers numerous times. As a result, the interfaces by which the storage devices couple to the computers may become damaged (e.g., due to friction).

BRIEF DESCRIPTION OF THE DRAWINGS

For a detailed description of exemplary embodiments of the invention, reference will now be made to the accompanying drawings in which:

FIG. 1 shows a computer chassis implementing the bay disclosed herein, in accordance with various embodiments;

FIG. 7a shows an illustrative, removable storage device, in accordance with various embodiments.

NOTATION AND NOMENCLATURE

Figure 2:
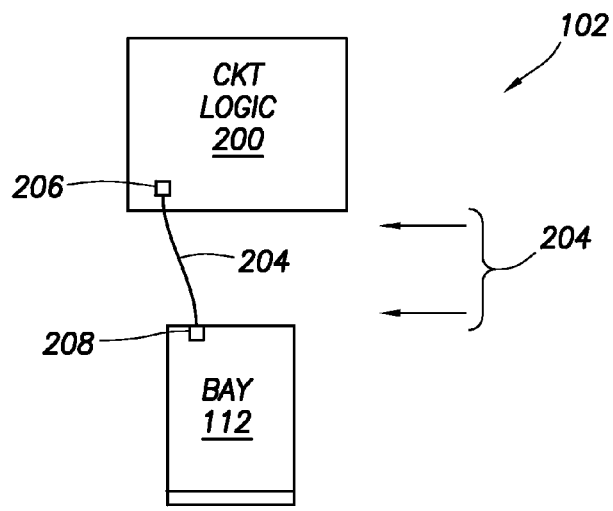
FIG. 2 shows a block diagram of an illustrative bay coupled to circuit logic via a connector, in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows a computer chassis 102. The chassis 102 may comprise various features, such as a power button 104, Universal Serial Bus (USB) connectors 106, multimedia connectors 108 and media stick connectors 110. The chassis 102 also comprises a bay 112. The bay 112 is adapted to receive and house removable storage devices (RSDs), such as the HEWLETT PACKARD® PERSONAL MEDIA DRIVE® or POCKET MEDIA DRIVE®. In some embodiments, the bay 112 may be adapted to house only one type of RSD, while in other embodiments, the bay 112 may be adapted to house multiple types of RSDs. In some embodiments, the bay 112 may comprise a flap cover which prevents debris from entering the bay 112 when the bay 112 does not contain an RSD.

FIG. 2 shows an illustrative block diagram of the bay 112 coupled to circuit logic (e.g., a motherboard, a processor) 200 housed within the computer chassis 102. The bay 112 couples to the circuit logic 200 by way of a connection 204, such as a USB cable. Other types of connections also may be used. The connection 204 comprises a first connector 206 (associated with the circuit logic 200) and a second connector 208 (associated with the bay 112). The connectors 206 and 208 may, for example, be USB connectors (e.g., USB type A connectors, USB type B connectors, mini USB connectors, mini USB 2.0 connectors), Firewire connectors, etc.

Figure 3A:
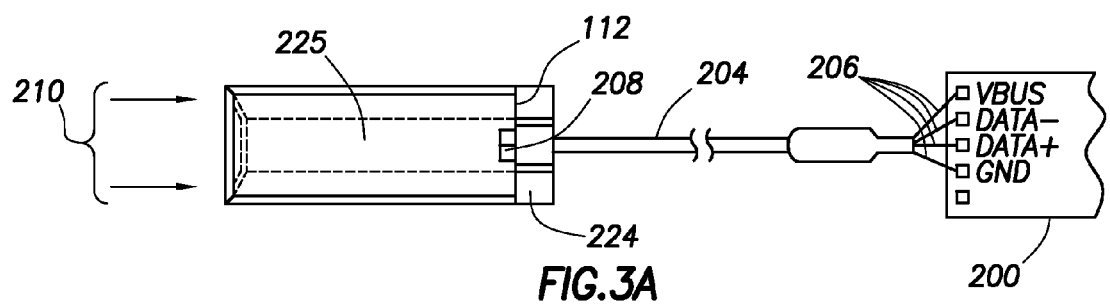
FIG. 3a shows another view of the block diagram of FIG. 2, in accordance with various embodiments.
Figure 3B:
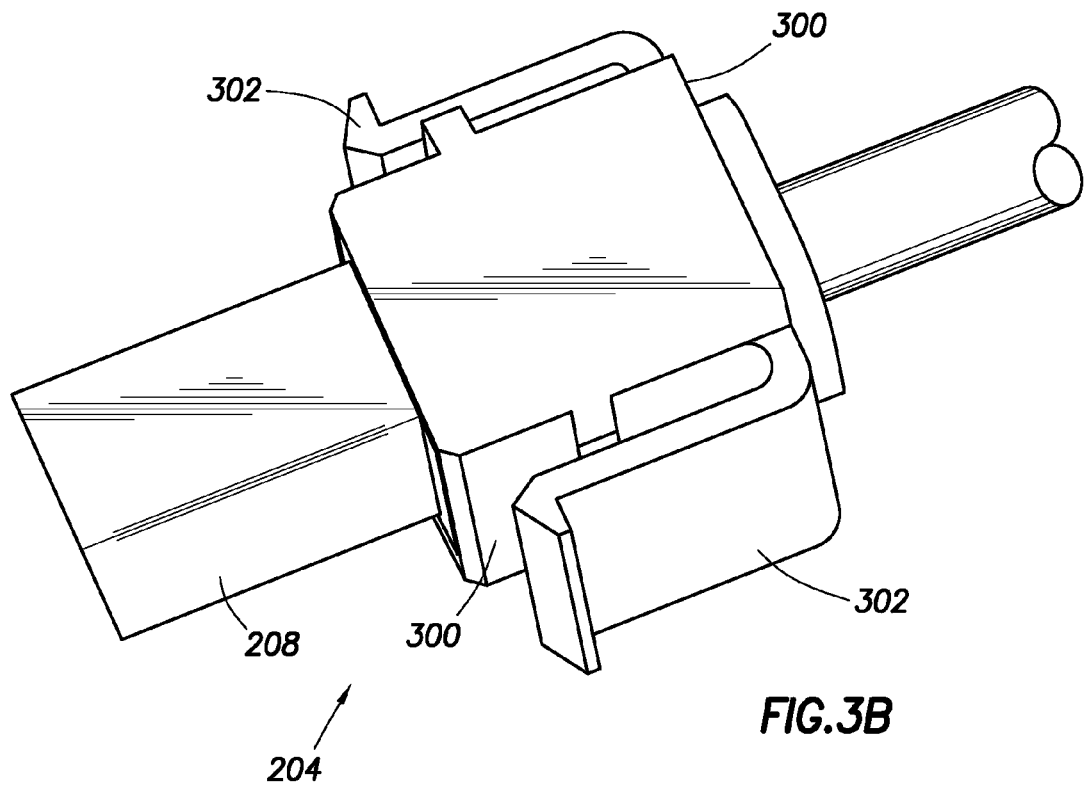
FIG. 3b shows an illustrative connector that couples to the bay of FIGS. 1 and 2 via a snap-in apparatus, in accordance with various embodiments.

Arrows 204 are indicative of the view shown in FIG. 3a. FIG. 3a shows the bay 112 coupled to the circuit logic 200 via the connection 204. The connection 204 comprises the connector 206 that couples to voltage, ground and data connectors of the circuit logic 200. The connection 204 also comprises the connector 208 which couples to the bay 112. The connector 208 couples to the bay 112 such that the connector 208 protrudes through a posterior plane 224 of the bay 112 into a cavity 225 of the bay 112. In at least some embodiments, the connector 208 may couple to the plane 224 using screws or similar hardware. In other embodiments, the connector 208 may couple to the plane 224 using a snap-in apparatus. FIG. 3b shows the connection 204 comprising the connector 208 and the snap-in apparatus 300 by which the connector 208 may couple to the posterior plane 224 of the bay 112. The snap-in apparatus 300 comprises tension wings 302 on multiple sides of the apparatus 300. The wings 302 comprise a flexible material, such as plastic, so that if the wings 302 are pushed toward the apparatus 300 and released, the wings 302 spring back to their original positions. The plane 224 of the bay 112 may comprise grooves or other appropriate receptacles adapted to couple to the snap-in apparatus 300. The snap-in apparatus 300 enables the connector 208 to couple to the plane 224 without the use of screws and other such hardware.

Figure 4:
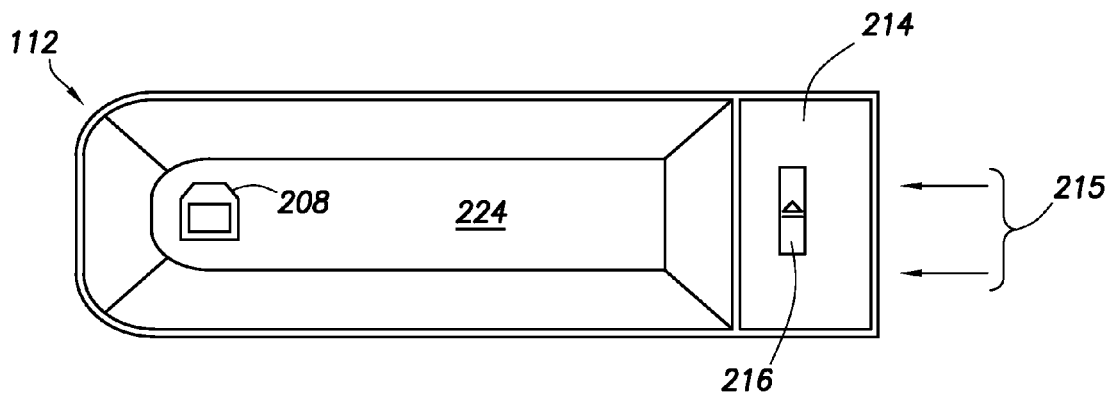
FIG. 4 shows a detailed view of the bay of FIGS. 1 and 2, in accordance with various embodiments.

Arrows 210 in FIG. 3a are indicative of the view shown in FIG. 4. FIG. 4 shows a front view of the bay 112. As explained, the bay 112 comprises the posterior plane 224 and the connector 208 protruding through the plane 224 into the cavity of the bay 112. Although not shown in other figures for the sake of simplicity, FIG. 4 also shows an ejection apparatus 214. The ejection apparatus 214 comprises an eject button 216. The ejection apparatus 214 comprises mechanisms (e.g., springs, pins, levers), shown in FIG. 5, which are able to cause an RSD housed within the bay 112 to disengage from the connector 208 and to be at least partially ejected from the bay 112. The mechanisms are activated by pressing the button 216.

Figure 5:
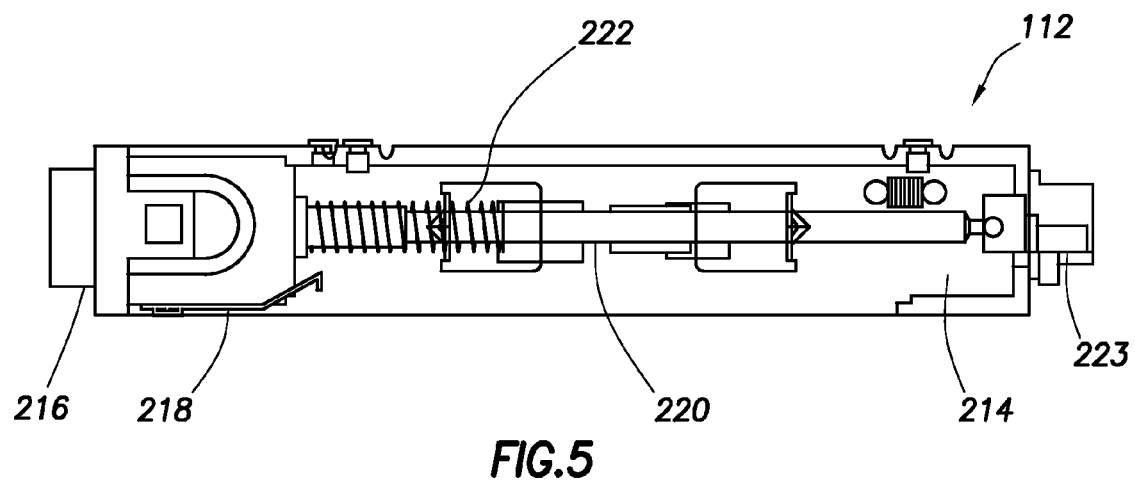
FIG. 5 shows an illustrative ejection apparatus coupled to the bay of FIGS. 1, 2 and 4, in accordance with various embodiments.

Arrows 215 are indicative of the view shown in FIG. 5. FIG. 5 shows a side view of the bay 112 and, more specifically, of the ejection apparatus 214. The ejection apparatus 214 comprises the button 216, a catch spring 218, an ejection pin 220, a compression spring 222 and an ejection lever 223. Full insertion of an RSD into the bay 112 causes the compression spring 222 to be compressed and the catch spring 218 to catch. In this way, the RSD is held in place in the bay 112 and remains coupled to the connector 208. When the button 216 is pressed, the catch spring 218 releases, the compression spring 222 decompresses and the ejection pin springs forward, causing the ejection level 23 to at least partially eject the RSD from the bay 112.

Figure 6:
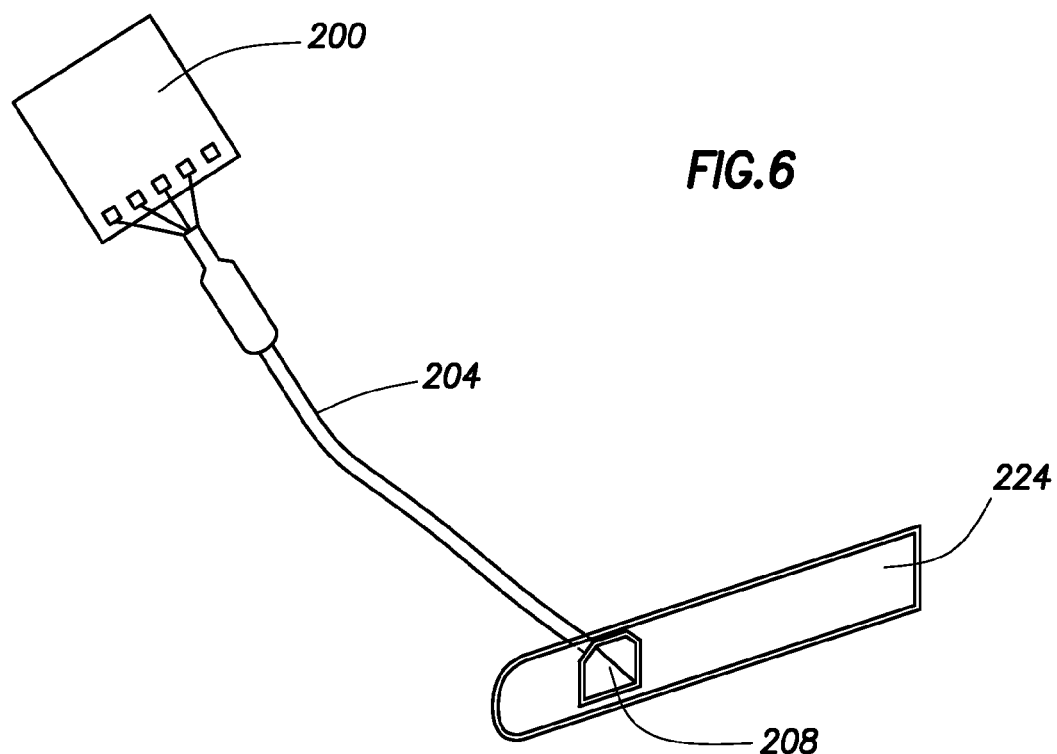
FIG. 6 shows a portion of the bay of FIGS. 1, 2 and 4 comprising an illustrative connector, in accordance with various embodiments.

FIG. 6 shows a detailed view of the posterior plane 224. As previously explained, the connector 208 couples to the plane 224 such that the connector 208 protrudes through the plane 224 and into a cavity (e.g., cavity 225 of FIG. 3a) of the bay 112. The connector 208 couples to the connection 204 and to the circuit logic 200. In at least some embodiments, the connector 208 may be lubricated so as to facilitate repeated coupling and de-coupling of the connector 208 with one or more RSDs. In this way, negative effects associated with friction are mitigated. Any suitable lubricant may be used, such as hydrofluoroether. In some embodiments, a portion (e.g., greater than 75%) of the lubricant comprises (or consists of) hydrofluoroether and the remainder of the lubricant comprises (or consists of) fluoroadditives. In some embodiments, the lubricant consists of hydrofluoroether. In some embodiments, the lubricant comprises hydrofluoroether and other material. Any and all such variations are encompassed within the scope of this disclosure. Although the lubricant may be applied in any suitable manner, in at least some embodiments, the lubricant may be applied by brushing a lubricant powder onto the connector 208.

Figure 7B:
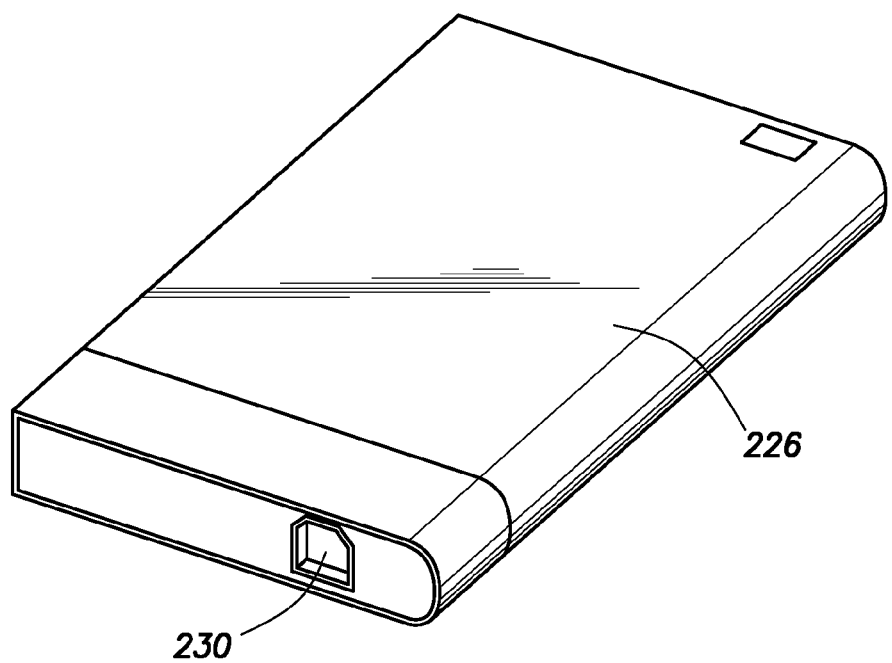
FIG. 7b shows another view of the removable storage device of FIG. 7a, in accordance with various embodiments.

FIG. 7a shows an illustrative RSD 226 that may be blind-mated to the connector 208 by inserting the RSD into the bay 112. The physical dimensions of the bay 112 may be modified as desired to accommodate any suitable type of RSD. Arrows 228 are indicative of the view shown in FIG. 7b. FIG. 7b shows a posterior side of the RSD 226. The RSD 226 comprises a female connector 230 capable of coupling (e.g., blind-mating) to the connector 208 in the bay 112. By coupling the RSD 226 to the connector 208, an electrical connection is established between the RSD 226 and the circuit logic 200 (FIG. 2) such that signals may be transferred therebetween. In some embodiments, the connector 230 may be lubricated with a suitable lubricant, such as hydrofluoroether. In some embodiments, a portion (e.g., greater than 75%) of the lubricant comprises (or consists of) hydrofluoroether and the remainder of the lubricant comprises (or consists of) fluoroadditives. In some embodiments, the lubricant consists of hydrofluoroether. In some embodiments, the lubricant comprises hydrofluoroether and other material. Any and all such variations are encompassed within the scope of this disclosure. Although the lubricant may be applied in any suitable manner, in at least some embodiments, the lubricant may be applied by brushing a lubricant powder onto the connector 230.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device, comprising:
    a cavity adapted to house a removable, electronic storage device; and
    a data connector adapted to blind-mate with said storage device;
    wherein the data connector is lubricated.

2. The device of claim 1, wherein the data connector is lubricated with hydrofluoroether.

3. The device of claim 1, wherein at least 75% of a lubricant applied to the data connector consists of hydrofluoroether.

4. The device of claim 1, wherein said data connector comprises a Universal Serial Bus (USB) Type B connector.

5. The device of claim 1, wherein the data connector couples to a frame of the device by way of a snap-in apparatus.

6. The device of claim 1, wherein the device comprises an ejection apparatus which, when activated, causes the electronic storage device to be at least partially ejected from the cavity.

7. The device of claim 1, wherein said electronic storage device comprises another connector adapted to couple to the data connector, and wherein the another connector is lubricated.

8. The device of claim 7, wherein said another connector is lubricated with hydrofluoroether.

9. A computer chassis, comprising:
    a bay adapted to house a removable storage device (RSD);
    circuit logic; and
    a connection having a first connector coupled to the circuit logic and a second connector coupled to the bay, said second connector adapted to couple to the RSD;
    wherein the second connector is coated with a lubricant.

10. The chassis of claim 9, wherein the lubricant comprises hydrofluoroether.

11. The chassis of claim 10, wherein the lubricant also comprises fluoroadditives.

12. The chassis of claim 9, wherein the second connector comprises a Universal Serial Bus (USB) connector.

13. The chassis of claim 9, wherein the second connector couples to the bay by way of a snap-in apparatus.

14. The chassis of claim 9, wherein the RSD is capable of being blind-mated to the second connector.

15. The chassis of claim 9, wherein the chassis comprises an ejection apparatus which, when pushed, causes the RSD to be de-coupled from the second connector.

16. The chassis of claim 9, wherein the RSD comprises another connector which blind-mates to the second connector, and wherein said another connector is lubricated with hydrofluoroether.

17. A system, comprising:
    means for housing a removable storage device; and
    means for coupling said removable storage device to circuit logic;
    wherein said means for coupling is at least partially coated with a lubricant.

18. The system of claim 17, wherein the system comprises a personal computer.

19. The system of claim 17, wherein the means for coupling comprises a Universal Serial Bus (USB) Type B connector.

20. The system of claim 17, wherein said lubricant comprises hydrofluoroether.

* * * * *